United States Patent [19]

Andeen et al.

[11] Patent Number: 4,637,736

[45] Date of Patent: Jan. 20, 1987

[54] SLIP SENSING METHOD AND APPARATUS

[75] Inventors: Gerry B. Andeen, Menlo Park; Eric J. Shrader, Palo Alto; Roy D. Kornbluh, Redwood City, all of Calif.

[73] Assignee: SRI International, Menlo Park, Calif.

[21] Appl. No.: 725,127

[22] Filed: Apr. 19, 1985

[51] Int. Cl.$^4$ .......................... G01K 7/00; B25J 15/02
[52] U.S. Cl. ..................................... 374/45; 294/907; 901/33
[58] Field of Search ........................ 901/32, 33, 34, 38; 294/907, 106, 86.4; 374/164, 141, 165, 185, 45

[56] References Cited

U.S. PATENT DOCUMENTS

| | | | |
|---|---|---|---|
| 2,539,399 | 1/1951 | Butland | 374/43 |
| 2,769,334 | 11/1956 | Soehngen | 374/432 |
| 3,216,241 | 11/1965 | Hansen | 374/31 |
| 3,904,234 | 9/1975 | Hill et al. | 294/106 |
| 4,127,031 | 11/1978 | Barnes | 374/183 |
| 4,143,549 | 3/1979 | Koehler | 374/114 |
| 4,166,451 | 9/1979 | Salera | 374/114 |
| 4,242,905 | 1/1981 | Challis | 374/45 |
| 4,265,117 | 5/1981 | Thoma et al. | 374/165 |
| 4,355,911 | 10/1982 | Tymkewicz | 374/165 |
| 4,358,957 | 11/1982 | Lougheed et al. | 374/165 |
| 4,420,965 | 12/1983 | Farkas et al. | 374/43 |
| 4,448,070 | 5/1984 | Ohyama et al. | 73/204 |
| 4,556,330 | 12/1985 | Regtien | 374/185 |
| 4,605,354 | 8/1986 | Daly | 294/907 |

FOREIGN PATENT DOCUMENTS

| | | | |
|---|---|---|---|
| 52-33254 | 3/1977 | Japan | 901/33 |
| 863332 | 9/1981 | U.S.S.R. | 901/33 |

OTHER PUBLICATIONS

Van Nostrand's Scientific Encyclopedia—1968 p. 94.
R. A. Russell, "Robotics Age," Oct. 1984 pp. 19-22.

Primary Examiner—Charles Frankfort
Assistant Examiner—W. Morris Worth
Attorney, Agent, or Firm—Victor H. Beckman

[57] ABSTRACT

A slip sensor and method of sensing slip for object supporting structure such as a manipulator which includes a pair of relatively movable jaws having opposing jaw faces between which an object may be gripped are shown. At least one thermistor is located at the face of the object supporting structure, which thermistor is intimately engageable with the supported object. The thermistor is maintained at a substantially constant temperature, above ambient temperature, by the passage of current therethrough. The temperature of the gripped object adjacent the thermistor is raised to the above-ambient temperature by heat conduction thereto from the thermistor. With slippage of the gripped object between the jaws, the thermistor is exposed to another portion of the object which is at a different temperature than the temperature of the thermistor whereby the resistance of the thermistor changes. The thermistor is included in a temperature sensing and control unit which maintains the thermistor at a substantially constant temperature, and which has an output related to power supplied to the thermistor to maintain the set-point temperature. The output is digitized and supplied to a digital computer for determining whether or not slippage of the object between the jaws has occurred.

15 Claims, 6 Drawing Figures

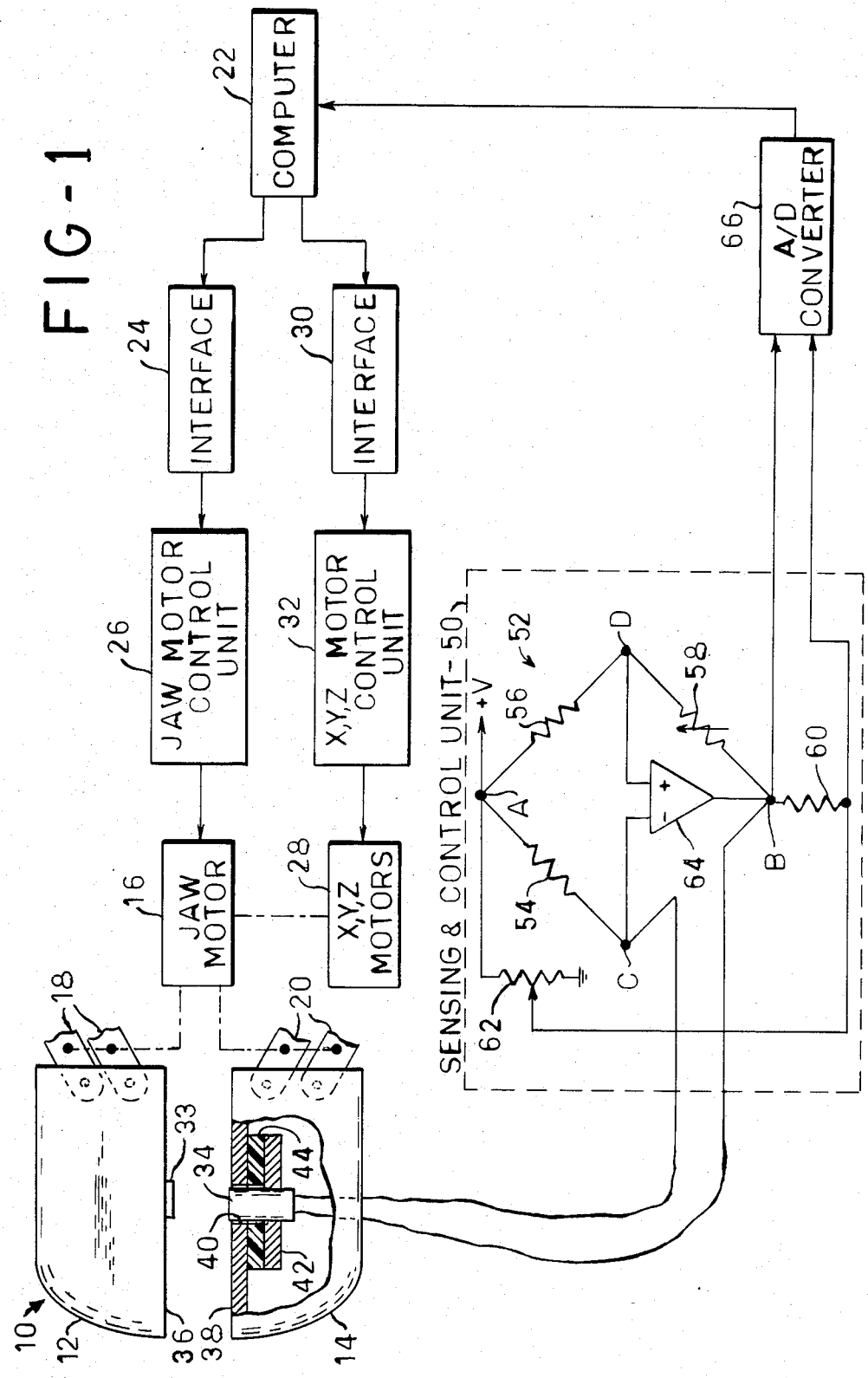

4,637,736

SLIP SENSING METHOD AND APPARATUS

FIELD OF THE INVENTION

This invention relates to method and apparatus for slip sensing which are well adapted for sensing slippage of objects relative to object supporting means such as jaws of gripper means.

BACKGROUND OF THE INVENTION

Slip sensors in gripper means are well known as shown, for example, in U.S. Pat. No. 3,904,234, Hill et al. Hot-wire anemometers for wind velocity measurements are also known wherein a wire is heated by the passage of current therethrough, and wind speed is determined by either current or resistance measurements thereon. Arrays of hot wires are used to determine wind direction. A hot-wire type fluid flow velocity meter is known as shown in U.S. Pat. No. 4,448,070, and a liquid motion sensing device is known as shown in U.S. Pat. No. 4,127,031, which employs a heater for heating water above ambient water temperature. Manipulators which include a thermistor at the jaw face for determining the type of object held by the jaws also are known as shown in an article by R. A. Russell, "Robotics Age," October 1984, pp. 19-22.

SUMMARY AND OBJECTS OF THE INVENTION

An object of this invention is the provision of a slip sensor for sensing slippage of objects relative to object supporting means which support the objects.

An object of this invention is the provision of a simplified slip sensor circuit.

An object of this invention is the provision of a slip sensor of the above mentioned type which is well adapted for use in a gripper mechanism.

The above and other objects and advantages are achieved by use of a thermal responsive element at the face of object supporting means which element is intimately engageable with the surface of an object supported thereby. The object supporting means may comprise the face of a gripper jaw, for example. The thermal responsive element is heated above ambient air temperature such that when an object at ambient temperature is initially engaged, heat is conducted from the heated thermal responsive element to the gripped object whereupon the thermal responsive element initially is cooled. In response to such cooling, the slip sensor circuit supplies additional current to heating means, which may comprise the thermal responsive element itself in the case a thermistor is employed as the thermal responsive element, to reheat the thermal responsive element. Slippage of the object relative to the object supporting means which exposes the thermal responsive element to a cooler location on the object face again results in momentary cooling of the thermal responsive element. The change in the output from the thermal responsive element due to such slippage is detected by the slip sensor circuit for an indication of slip.

BRIEF DESCRIPTION OF THE DRAWINGS

The invention will be better understood from a consideration of the following description taken in connection with the accompanying drawings. It will be understood that the drawings are for purposes of illustration only and that the invention is not limited to the specific embodiments disclosed.

In the drawings, wherein like reference characters refer to the same parts in the several views:

FIG. 1 is a fragmentary side elevational view of gripper means with a slip sensor together with a block diagram of slip sensing circuit;

Figure 2A:
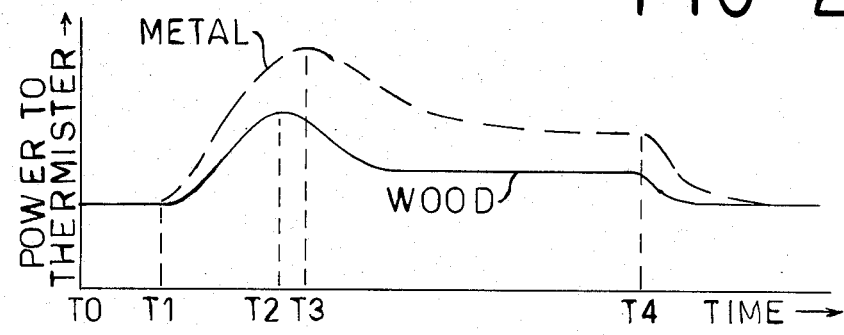
FIGS. 2A and 2B are graphs of power versus time for use in explaining operation of the slip sensor.

Reference first is made to FIG. 1 wherein gripper means 10 is shown which includes a pair of jaws 12 and 14 which are movable between open and closed positions by means of a reversible jaw-operating motor 16 connected thereto through pairs of parallel links 18 and 20 to the jaws. Opening and closing operation of the jaws is under control of a computer 22 connected to the jaw-operating motor 16 through interface 24 and motor control unit 26. The jaw-operating motor is carried by a robot, automated machinery, a vehicle, or the like, which may include orientation and X, Y and Z positioning motors 28 for locating the jaws in space, which motors also may be under control of computer 22 through interface 30 and X, Y and Z motor control unit 32. Generally, force sensors may be included on the manipulator, for force sensing, and in FIG. 1 force sensor 33 is shown at the face of jaw 12. The output from the force sensor is digitized and supplied to computer 22 for use thereby.

In accordance with the present invention, at least one thermal responsive element is located at one of the opposite object supporting faces 36 and 38 of the jaws 12 and 14, respectively. In FIG. 1 a single thermal responsive element 34, comprising a thermistor, is shown at the face 38 of jaw 14. The free end of the thermistor extends outwardly from the jaw face 38 through a clearance hole 40 therein, and is adapted for intimate engagement with the flat surface of an object carried between the jaws. The thermistor is fixedly secured to a rear plate 42 inside the jaw housing, and an elastomeric member 44, such as an elastomeric glue joint, connects the plate 42 to the inside surface of the jaw face 38. With an object gripped between the jaws, the thermistor is resiliently biased by member 44 against the gripped object. Obviously, other means, such as spring operated means, may be used to resiliently bias thermal responsive means 34 in an outwardly direction from the face of the jaw to provide for intimate contact between the gripped object and thermal responsive means 34.

Where the thermal responsive means 34 comprises a thermistor, a temperature sensing and control unit 50 shown in FIG. 1 may be used therewith. As seen in FIG. 1 thermistor 34 comprises one arm of a resistor bridge 52, the other arms of which bridge comprise resistors 54 and 56 and variable resistor 58. One input terminal A of the bridge is connected to a dc supply source +V and the other input terminal B is connected through a load resistor 60 to the movable arm of a potentiometer 62 which is connected between the +V and ground. The bridge output terminals C and D are connected to the inverting (−) and non-inverting (+) inputs of operational amplifier (op-amp) 64, respectively, and the amplifier output is connected to input terminal B of the bridge. It will be seen, then, that thermistor 34 and variable resistor 58 are included in negative and positive feedback paths, respectively, of op-amp 64. Variable resistor 58 is adjusted to balance the bridge, and potentiometer 62 is adjusted to provide the desired offset for the output signal developed across load resistor 60. The output across load resistor 60 is supplied to an analog to digital (A/D) converter 66 for conversion to digital form, and the A/D converter output is supplied to computer 22 for digital processing thereof.

Figure 4:
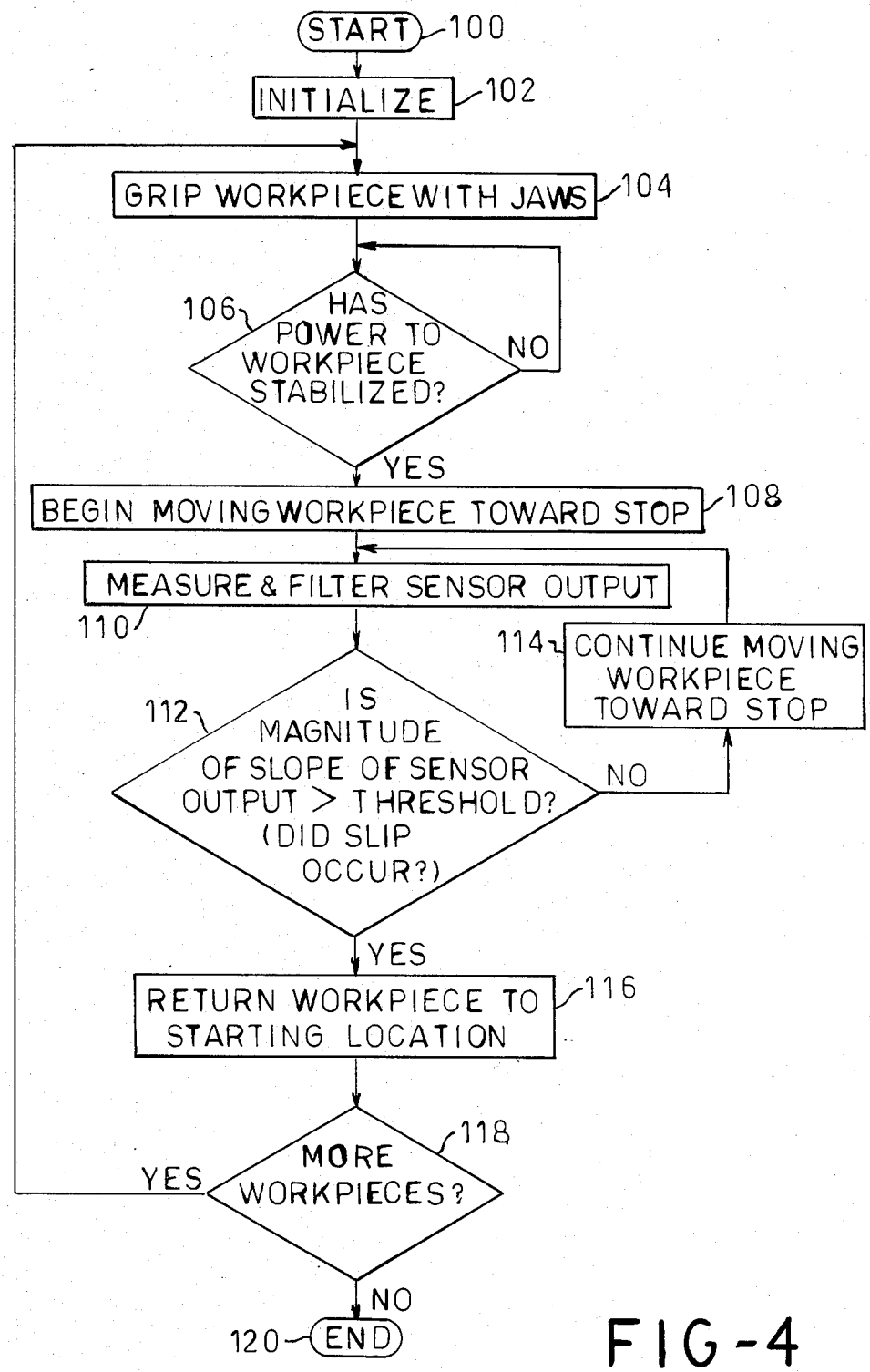
FIG. 4 is a flow diagram for use in explaining operation of the slip sensor.

Temperature sensing and control unit 50 functions as a feedback controller to maintain thermistor 34 at a substantially constant temperature. If, the thermistor temperature decreases due, say, to engagement thereof with an object at ambient temperature, the thermistor resistance increases thereby increasing the voltage at bridge terminal C at the inverting input (−) to op-amp 64. Consequently, the op-amp output at bridge terminal B is reduced, and current flow through the thermistor is increased to increase the temperature thereof to a level where the bridge is again balanced. The output voltage across load resistor 60 thereby decreases, then increases, when the thermistor temperature decreases, and then increases. This output voltage, which is converted to digital form, is processed in software at digital computer 22. An example of software processing for slip sensing is shown in the flow chart of FIG. 4 described hereinbelow.

Reference now is made to FIG. 2A wherein graphs of power to the thermistor versus time for a gripped object of wood, which is a poor conductor of heat, and one of metal, which is a good conductor of heat, are shown. With the jaws empty and open such that thermistor 34 is exposed to ambient air, the thermistor is maintained at an above-ambient temperature, determined by the bridge resistances, by the power shown at time T0. At time T1, when an object at ambient temperature is gripped between the jaws, the thermistor temperature decreases slightly toward ambient temperature, which immediately causes the op-amp 64 to deliver more power to the thermistor to bring the thermistor temperature back to the set-point temperature. The power required to restore the set-point temperature is dependent upon the thermal diffusivity of the object, which is greater for the metal object than for the wood object.

For the wood object, the power to the thermistor stops increasing at time T2, and then begins to decrease. For the metal object, the rate of power increase is greater than for the wood object, and a higher maximum power is reached at T3. After reaching a maximum the thermistor power level returns toward the power level that will result in the thermistor holding the set point. When the grip is released, at time T4, the power required to hold the temperature set point drops to the original power level at T0.

Figure 2B:
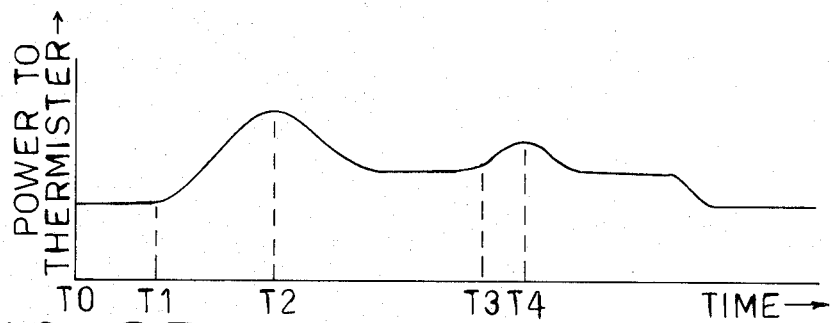

Reference now is made to FIG. 2B wherein a power versus time graph illustrating slippage of a gripped object is shown. As with the graphs shown in FIG. 2A, the power at time T0 represents the thermistor power with the jaws open and the thermistor exposed to ambient air. At time T1, the thermistor power begins to increase when an object at ambient temperature is first gripped by the jaws. The power increases until time T2, at which time the maximum power is reached. The power then decreases as the temperatures in the region of the contact point approach their steady state values. When slippage of the gripped object between the jaws occurs, at time T3, the thermistor contacts a different, cooler, area of the object, thereby increasing the power required to maintain a constant thermistor temperature a second time. As described above, the power level increases to a maximum at time T4 and then decreases as the contact area heats up to the thermistor set-point temperature. The voltage across load resistor 60, which is supplied to A/D converter 66, is directly related to the power being supplied to the thermistor. The computer 22 is programmed to measure the slope of the temperature curve for use in slip detection.

Figure 3:
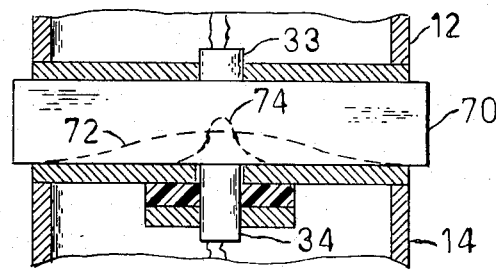
FIG. 3 is a fragmentary sectional view of gripper means and associated thermal sensor in engagement with an object to be moved.

Reference now is made to FIG. 3 wherein an object 70 is shown gripped between the jaws 12 and 14 of the manipulator. Two different plots 72 and 74 of the object surface temperature are shown at the object adjacent to the thermistor 34. For an object comprising a good thermal conductor, such as metal, a relatively flat curve 72 is produced since heat is readily conducted away from the object surface. For an object comprising a poor thermal conductor, such as plastic, a sharply peaked curve 74 is produced by the heated thermistor since heat is conducted away from the object surface relatively slowly. From FIG. 3, it will be apparent that thermistor 34 is exposed to a relatively large temperature change with a small amount of slippage of an object which is a good insulator, whereas the same amount of slippage of an object which is a good thermal conductor will result in only a small temperature change at the thermistor. As a result small slippage of a good thermal conducting object often is more difficult to detect than the same slippage of a good thermal insulating object.

Any desired use may be made of the slippage information, the invention not being limited to any particular use. One use thereof, implemented by computer 22, is illustrated in the flow chart in FIG. 4, to which figure reference now is made. It here will be noted one or more programming steps may be involved in the actual implementation of the indicated operation. Since the programming of such steps for the indicated operations is well within the skill of the average programmer, a complete program listing is not included herein.

Information concerning the position of the manipulator in space, and jaw force information, are provided to computer 22 by means not shown, together with the output from the temperature sensing and control unit 50. With the illustrated process, a workpiece at a position not accurately known relative to the manipulator is moved by the manipulator into a known position. This step of accurately positioning the workpiece relative to the manipulator before performing the desired operation on or with the workpiece includes obtaining a measure of the slope of the output signal from the temperature sensing and control unit 50, which slope provides an indication of slip as noted above.

The operation is started as indicated by START step 100, at which time system power is turned on, or a reset operation is performed, by means not shown. Initialization step 102 includes initial setting of counters, registers, and the like in computer 22. At step 104 the workpiece which is at a location that is inaccurately known relative to the manipulator is gripped with the jaws. Decision step 106 determines whether or not power to the thermistor has stabilized following initial gripping of the workpiece. If power has not stabilized, step 106 is reentered.

When power is stabilized, movement of the workpiece toward a fixed stop, the position of which is accurately known, is begun as indicated by step 108. The sensor output is measured and filtered at step 110, and decision step 112 is entered. Decision step 112 determines whether or not slip has occured by obtaining a measure of the magnitude of the slop of the sensor output and comparing the same with a threshold value. If the threshold value is not exceeded, step 114 is entered whereupon the workpiece is further moved against the fixed stop and decision step 112 is reenterd through step 110. If, on the other hand, power changes are determined to have resulted from slippage, step 116 is entered. At this point in the operation, the positions of the workpiece and manipulator are known with a high degree of accuracy. At step 116, the workpiece may be regripped, if desired, and the desired functions of the manipulator then performed using the high degree of accuracy obtained as a result of the above describe operations. When operation of the workpiece is terminated, the grip thereon is released, and decision step 118 is entered to determine whether or not more workpieces are available for processing. If processing is to continue, step 104 is reentered. If not, operation is terminated an END, step 120.

In the illustrated embodiment, slip recognition has been programmed to response to the absolute value of the slope of power versus time. Whereas slip usually produces an increase in power to the thermistor because it is in contact with a cooler surface, there are situations where the power may decrease, such as when the object surface is rough. The movement of the object relative to the thermistor may decrease the quality of the contact between the two, and give a reduction in power.

The slip sensor of this invention is capable of operating on a variety of materials with a wide range of thermal conductivities, such as aluminum and wood, without a prior knowledge of the thermal properties of the material. If the thermal properties are known, as is often the case, step 112 may be designed for the specific material for increased sensitivity of the slip sensor by adjusting the threshold of slip detection to an optimum found by previous experience for that material.

As noted above, with reference to FIG. 2A, the power vs time plots differ for materials having different thermal diffusivities. The response when the workpiece is initially gripped may be measured, and such measurements may be used to set the threshold included in decision step 112. Also, the initial measurements may be used to provide an approximate identification of the thermal conductivity of the workpiece; thermal conductivity being an element of thermal diffusivity thereof. Material identification by this approach could be used to supplement information from vision systems or other tactile sensors.

Figure 5:
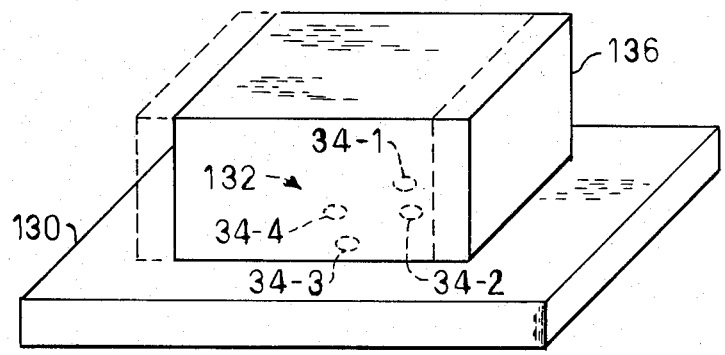
FIG. 5 is a perspective view showing an array of thermal sensors at the face of object supporting means for use in detecting direction of slip.

As noted above, the slip sensor of this invention is not limited to use with grippers. For example, the sensor may be included at the face of a plane object supporting surface for sensing slip of an object supported thereon. Reference now is made to FIG. 5 wherein a modified form of this invention is shown comprising object supporting means 130 with an array 132 of thermal responsive elements, such as thermistors 34-1, through 34-4 at the upper face thereof.

The thermistors are adapted for connection to individual temperature sensing and control units such as unit 50 shown in FIG. 1 and described above. Outputs from the temperature sensing and control units are supplied to a computer or dedicated circuit for evaluating the individual temperature indicating signals therefrom and producing an output when slippage occurs.

In FIG. 5, an object 136 is shown supported on member 130 at the thermistor array. Assume, for purposes of illustration, that slippage of the object leftwardly, to the broken line position, takes place after the power to the thermistors has stabilized following placement of the object on member 130. With such movement, thermistors 34-1, 34-2 and 34-3 engage relatively cool areas of the object, and thermistor 34-4 engages the area already heated by thermistor 34-2. The outputs from the associated temperature sensing and control units are processed to indicate a slip to the left when the temperature of thermistors 34-1, 34-2 and 34-3 changes, but the temperature of thermistor does not, or changes to a far lesser degree.

If desired, thermistors may be located over the entire face of member 130. Then, if the supported object covers thermistors at the central portion of the surface, but not those adjacent the edges, the resultant thermistor signals may be processed so as to identify the shape of the object in addition to slip and direction of slip.

The invention having been described in detail in accordance with requirements of the patent Statutes, other changes and modifications will suggest themselves to those skilled in the art. As noted above, thermal responsive means other than thermistors may be employed in the slip sensor. Generally a separate heater is required for heating other thermal sensing means to a temperature above ambient temperature. Also, analog processing of the output from temperature sensing and control unit 50 may be employed instead of the illustrated digital processing. It is intended that the above and other such changes and modifications shall fall within the spirit and scope of the invention as defined in the appended claims.

We claim:

1. Slip sensing means for sensing slip between an object and object supporting means having at least one supporting surface, said slip sensing means comprising
    thermal responsive means located at the supporting surface of the object supporting means and adapted for intimate engagement with the face of an object supported thereby,
    an electrical current source for electrically heating and thermal responsive means,
    means for controlling the electrical current to maintain the temperature of the thermal responsive means and the localized temperature of the object at the point on engagement therewith at a subtantially constant temperature above ambient temperature, the temperature at the surface of the object decreasing with distance from the heated thermal responsive means, the temperature of the thermal responsive means at least momentarily changing with initial engagement thereof with the object and with slip of the object along the object supporting means after said initial engagement, and
    means for detecting change in the electrical current in response to temperature change of the thermal responsive means due to slip of the object along the object supporting means for sensing said slip.

2. Slip sensing means as defined in claim 1 wherein said object supporting means comprises gripping means having a pair of opposing supporting surfaces between which the object is gripped, said thermal responsive means being located at one of the opposing supporting surfaces of the gripping means.

3. Slip sensing means as defined in claim 1 wherein said thermal responsive means comprises a thermistor.

4. Slip sensing means for sensing slip between an object and object supporting means having at least one supporting surface, said slip sensing means comprising thermal responsive means located at the supporting surface of the object supporting means and adapted for intimate engagement with the face of an object supported thereby, means for electrically heating said thermal responsive means to maintain the temperature thereof and the localized temperature of the object at the point of engagement therewith above ambient temperature, the temperature at the surface of the object decreasing with distance from the heated thermal responsive means, the temperature of the thermal responsive means at least momentarily changing with initial engagement thereof with the object and with slip of the object along the object supporting means after said initial engagement, and means for detecting change in the thermal responsive means in response to temperature change thereof due to slip of the object along the object supporting means for sensing said slip, said thermal responsive means comprising a thermistor, said means for electrically heating said thermistor comprising a resistor bridge, one arm of which bridge comprises said thermistor, a load resistor, a source of d.c. potential connected across one pair of opposed bridge junctions through said load resistor, operational amplifier means having a pair of input terminals connected across the other pair of opposed bridge junctions, and means for connecting the operational amplifier means output to the one bridge junction to which said thermistor and load resistor are connected, said thermistor providing a negative feedback path for said operational amplifier means.

5. Slip sensing means as defined in claim 4 wherein said detecting means includes means for obtaining a measure of the magnitude of the time rate of change of voltage at the load resistor and comparing the same to a threshold level, slip being indicated when said magnitude exceeds said threshold level.

6. Slip sensing means as defined in claim 1 wherein said thermal responsive means includes an array of thermal responsive elements at said supporting surface of the object supporting means for use in sensing both slip and direction of slip.

7. A method of sensing slip between an object and object supporting means comprising, locating at least one thermal responsive element at the object supporting surface for intimate engagement with an object supported by the object supporting means, passing current through the thermal responsive element for heating the same to a temperature greater than ambient temperature and for localized heating of the object to substantially the temperature of the heated thermal responsive element, the temperature of the supported object decreasing toward ambient temperature with increased distance from the heated thermal responsive element, controlling current flow through the thermal responsive element to maintain the same at substantially constant temperature, and sensing changes in current flow through the thermal responsive element in response to change in temperature of the object at the heated thermal responsive element to provide an indication of relative slip between the object and the object supporting means.

8. A method of sensing slip as defined in claim 7 including employing a thermistor as the thermal responsive element.

9. A method of sensing slip between an object and object supporting means comprising, locating at least one thermal responsive element at the object supporting surface for intimate engagement with an object supported by the object supporting means, heating the thermal responsive element to a temperature greater than ambient temperature for localized heating of the object to substantially the temperature of the heated thermal responsive element, the temperature of the supported object decreasing toward ambient temperature with increased distance from the heated thermal responsive element, sensing temperature changes of the thermal responsive element to provide an indication of relative slip between the object and object supporting means, including said thermal responsive element in the negative feedback path of an operational amplifier and as one arm of a resistor bridge, input to the operational amplifier being obtained from one pair of opposed bridge terminals, and, supplying the other pair of opposed bridge junctions with a d.c. potential source through a load resistor, current flow through the load resistor being indicative of thermal responsive element temperature.

10. A method of sensing slip between an object and object supporting means comprising, locating at least one thermal responsive element at the object supporting surface for intimate engagement with an object supported by the object supporting means, heating the thermal responsive element to a temperature greater than ambient temperature for localized heating of the object to substantially the temperature of the heated thermal responsive element, the temperature of the supported object decreasing toward ambient temperature with increased distance from the heated thermal responsive element, and sensing temperature changes of the thermal responsive element to provide an indication of relative slip between the object and object supporting means, the step of heating the thermal responsive element includes controlling power to the thermal responsive element to maintain the same at a substantially constant temperature, and said step of sensing temperature changes of the thermal responsive element includes sensing changes in power supplied to the thermal responsive element to provide an indication of relative slip between the object and object supporting means.

11. A method of sensing slip as defined in claim 10 including employing a thermistor as the thermal responsive element.

12. A circuit arrangement for maintaining a thermistor at a substantially constant temperature and for sensing changes in resistance thereof for use in a slip detector, comprising a resistor bridge in which said thermistor comprises one arm of the bridge, a load resistor, a source of d.c. potential connected across one pair of opposed bridge junctions through said load resistor, an operational amplifier having a pair of input terminals connected across the other pair of opposed bridge junctions, and means for connecting the operational amplifier output to the one bridge junction to which said thermistor and load resistor are connected, the voltage across the load resistor being related to the temperature of the thermistor.

13. A circuit arrangement as defined in claim 12 wherein said thermistor is located at the face of object supporting means for intimate contact with an object supported thereby, the voltage across the load resistor changing with slippage of the object relative to the object supporting means.

14. A circuit arrangement as defined in claim 13 wherein the object supporting means comprise gripper means by which the object is gripped.

15. A circuit arrangement as defined in claim 13 including means for obtaining a measure of the magnitude of the time rate of change of the voltage across the load resistor, slippage of the object relative to the object supporting means being detected when said magnitude exceeds a predetermined level of the time rate of change at said substantially constant temperature.

* * * * *